(12) United States Patent
Sun et al.

(10) Patent No.: US 11,846,851 B2
(45) Date of Patent: Dec. 19, 2023

(54) DISPLAY PANEL, METHOD FOR MANUFACTURING SAME, AND DISPLAY DEVICE

(71) Applicant: BOE Technology Group Co., Ltd., Beijing (CN)

(72) Inventors: Yanliu Sun, Beijing (CN); Pengxia Liang, Beijing (CN); Shiyu Zhang, Beijing (CN); Ge Shi, Beijing (CN); Zheng Fang, Beijing (CN); Yuyao Wang, Beijing (CN); Meina Yu, Beijing (CN); Jiahui Han, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 220 days.

(21) Appl. No.: 17/426,052

(22) PCT Filed: Oct. 20, 2020

(86) PCT No.: PCT/CN2020/122255
§ 371 (c)(1),
(2) Date: Jul. 27, 2021

(87) PCT Pub. No.: WO2022/082448
PCT Pub. Date: Apr. 28, 2022

(65) Prior Publication Data
US 2022/0317500 A1    Oct. 6, 2022

(51) Int. Cl.
*G02F 1/1343* (2006.01)
*G02F 1/1335* (2006.01)
*G02F 1/13357* (2006.01)
*G02F 1/1368* (2006.01)

(52) U.S. Cl.
CPC .... *G02F 1/13439* (2013.01); *G02F 1/133553* (2013.01); *G02F 1/133616* (2021.01); *G02F 1/133621* (2013.01); *G02F 1/1368* (2013.01)

(58) Field of Classification Search
CPC .......... G02F 1/13439; G02F 1/133616; G02F 1/133553; G02F 1/133621
See application file for complete search history.

(56) References Cited

FOREIGN PATENT DOCUMENTS

| EP | 1662301 A1 * | 5/2006 | ....... G02F 1/133512 |
|---|---|---|---|
| WO | WO-2007083408 A1 * | 7/2007 | ....... G02F 1/133603 |

OTHER PUBLICATIONS

Machine translation of KR 20070016268 A (Year: 2007).*

* cited by examiner

*Primary Examiner* — Lucy P Chien
(74) *Attorney, Agent, or Firm* — IPro, PLLC (57) ABSTRACT

A display panel includes: a first substrate and a second substrate which are oppositely disposed. The first substrate may include one or more light-emitting unit, and the second substrate may include two or more reflective electrodes. All first reflective electrodes in the display panel are capable of reflecting light emitted by the light-emitting unit to a first view zone, and all second reflective electrodes are capable of emitting the light emitted by the light-emitting unit to a second view zone.

19 Claims, 5 Drawing Sheets

DISPLAY PANEL, METHOD FOR MANUFACTURING SAME, AND DISPLAY DEVICE

CROSS-REFERENCE TO RELATED APPLICATIONS

This application is a US national stage of international application No. PCT/CN2020/122255, filed on Oct. 20, 2020, the disclosure of which is herein incorporated by reference in its entirety.

TECHNICAL FIELD

The present disclosure relates to the field of display technologies, and in particular to a display panel, a method for manufacturing the same, and a display device.

BACKGROUND

With the development of display technologies, an increasing demand is imposed for reducing for power consumption of display panels. Compared with a liquid crystal display panel, a reflective liquid crystal display panel has merits such as low power consumption and thin thickness, such that the reflective liquid crystal display panels are being increasingly demanded in the market.

SUMMARY

Embodiments of the present disclosure provide a display panel, a method for manufacturing the same, and a display device. The technical solutions are as follows.

In one aspect, a display panel is provided. The display panel includes:

a first substrate and a second substrate which are oppositely disposed; wherein the first substrate includes one or more light-emitting units;

the second substrate includes two or more reflective electrodes, wherein one of the one or more light-emitting units corresponds to at least two of the two or more reflective electrodes, and the at least two of the two or more reflective electrodes corresponding to the one of the one or more light-emitting units are disposed in an irradiation region of the light-emitting unit on the second substrate;

wherein the at least two of the two or more reflective electrodes corresponding to the one of the one or more light-emitting units include a first reflective electrode and a second reflective electrode, the first reflective electrode being configured to reflect light emitted by the light-emitting unit to a first view zone, and the second reflective electrode being configured to reflect the light emitted by the light-emitting unit to a second view zone.

Optionally, in the at least two of the two or more reflective electrodes corresponding to the one of the one or more light-emitting units, a voltage applied to the first reflective electrode is different from a voltage applied to the second reflective electrode.

Optionally, the second substrate further includes a second base substrate, and the at least two of the two or more reflective electrodes are disposed on the second base substrate;

the one or more light-emitting units include one column of second light-emitting units arranged in a column and two or more columns of first light-emitting units arranged in columns, wherein the one column of second light-emitting units is disposed between the two or more columns of first light-emitting units; a light-reflecting surface of the reflective electrode corresponding to the second light-emitting units is parallel to the second base substrate; and a light-reflecting surface of the reflective electrode corresponding to the first light-emitting units is tilted toward the one column of second light-emitting units.

Optionally, in a same column of first light-emitting units, tilt angles of the light-reflecting surfaces of the reflective electrodes corresponding to each of the first light-emitting units toward the one column of second light-emitting units are equal.

Optionally, two columns of first target light-emitting units in the two or more columns of first light-emitting units satisfy the following conditions: the two columns of first target light-emitting units are respectively disposed on two sides of the one column of second light-emitting units, distances between the two columns of first target light-emitting units and the one column of second light-emitting units are the same, and in the two columns of first target light-emitting units, tilt angles of the light-reflecting surfaces of the reflective electrodes corresponding to each of the first target light-emitting units toward the one column of second light-emitting units are equal.

Optionally, in an $i^{th}$ column of first light-emitting units disposed on any side of the one column of second light-emitting units, tilt angles $\theta$ of the light-reflecting surfaces of the reflective electrodes corresponding to the first light-emitting units toward the one column of second light-emitting units satisfy the following formula:

$$\theta = \frac{i \times W}{2H},$$

wherein W represents a width of the irradiation region of the first light-emitting unit on the second substrate, and H represents a vertical distance between the first view zone and the second view zone and the display panel.

Optionally, the at least two of the two or more reflective electrodes corresponding to the one of the one or more light-emitting units further include one or more third reflective electrodes disposed between the first reflective electrode and the second reflective electrode.

Optionally, in two or more reflective electrodes corresponding to any two of the one or more light-emitting units, an equal number of the third reflective electrodes are disposed between the first reflective electrodes and the second reflective electrodes.

Optionally, an equal number of the reflective electrodes correspond to each of the one or more light-emitting units.

Optionally, the reflective electrodes corresponding to each of the one or more light-emitting units are arranged in an array, and the reflective electrodes corresponding to any two of the one or more light-emitting units are arranged in arrays containing an equal number of rows and an equal number of columns.

Optionally, the array of the reflective electrodes corresponding to each of the one or more light-emitting units contains an equal number of rows and columns.

Optionally, the display panel further includes a liquid crystal layer disposed between the first substrate and the second substrate.

Optionally, the display panel includes one or more pixel units, wherein the pixel unit includes one of the one or more light-emitting units, and at least two reflective electrodes corresponding to the one of the one or more light-emitting units, the one of the one or more light-emitting units in the pixel unit being configured to emit light of one color.

Optionally, the light-emitting unit includes a red light-emitting unit, a green light-emitting unit, and a blue light-emitting unit which are laminated in a direction parallel to a light-emitting surface of the display panel.

Optionally, the first substrate further includes one or more light-emitting unit driving circuits electrically connected to the one or more light-emitting units in one-to-one correspondence, wherein the light-emitting unit driving circuit is configured to control a color and a brightness of the light emitted by a corresponding light-emitting unit.

Optionally, the first substrate further includes a first base substrate, the one or more light-emitting units are disposed on one side of the first base substrate, and the first substrate further includes a common electrode disposed on the other side of the first base substrate, the common electrode being, relative to the light-emitting unit, proximal to the second substrate.

Optionally, the second substrate further includes a second base substrate, the two or more reflective electrodes are disposed on the second base substrate, and the second substrate further includes one or more thin film transistors disposed on the second base substrate and electrically connected to each of the reflective electrodes.

In another aspect, a method for manufacturing a display panel is provided. The method includes:

acquiring a first substrate by forming one or more light-emitting units on a first base substrate;

acquiring a second substrate by forming two or more reflective electrodes on a second base substrate; and forming the display panel by oppositely disposing the first substrate and the second substrate;

wherein one of the one or more light-emitting units corresponds to at least two of the two or more reflective electrodes, and the at least two of the two or more reflective electrodes corresponding to the one of the one or more light-emitting units are disposed in an irradiation region of the light-emitting unit on the second substrate; and the at least two of the one or more reflective electrodes corresponding to the one of the one or more light-emitting units include a first reflective electrode and a second reflective electrode, the first reflective electrode being configured to reflect light emitted by the light-emitting unit to a first view zone, and the second reflective electrode being configured to reflect the light emitted by the light-emitting unit to a second view zone.

Optionally, forming the two or more reflective electrodes on the second base substrate includes:

forming an insulating layer on the second base substrate, and forming a slope on the insulating layer by performing at least one patterning process on the insulating layer; and forming the two or more reflective electrodes on the insulating layer with the slope, such that an included angle is defined between a reflecting surface of the reflective electrode on the slope and the second base substrate.

In yet another aspect, a display device is provided. The display device includes the above display panel.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

In the related art, a reflective liquid crystal display panel is only capable of displaying 2D images, and the function of the reflective liquid crystal display panel is relatively single. Therefore, there is an urgent need for a reflective liquid crystal display panel capable of displaying 3D images to enrich the functions of the reflective liquid crystal display panel.

Figure 1:
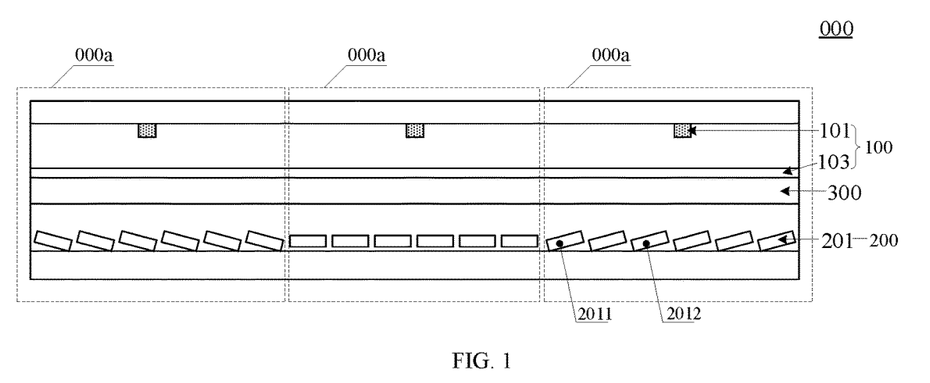
FIG. 1 is a schematic diagram of a film layer structure of a display panel according to an embodiment of the present disclosure.

Referring to FIG. 1, a schematic diagram of a film layer structure of a display panel according to an embodiment of the present disclosure is illustrated. The display panel 000 may include a first substrate 100 and a second substrate 200 which are oppositely disposed.

The first substrate 100 may include: one or more light-emitting units 101.

The second substrate 200 may include: two or more reflective electrodes 201. One light-emitting unit 101 may correspond to at least two reflective electrodes 201, and the at least two reflective electrodes 201 corresponding to the light-emitting unit 101 are disposed in an irradiation region of the light-emitting unit 101 on the second substrate 200.

In the embodiment of the present disclosure, the at least two reflective electrodes 201 corresponding to one light-emitting unit 101 include: a first reflective electrode 2011 and a second reflective electrode 2012. The first reflective electrode 2011 is configured to reflect light emitted by the light-emitting unit 101 to a first view zone, and the second reflective electrode 2012 is configured to reflect the light emitted by the light-emitting unit 101 to a second view zone.

Figure 2:
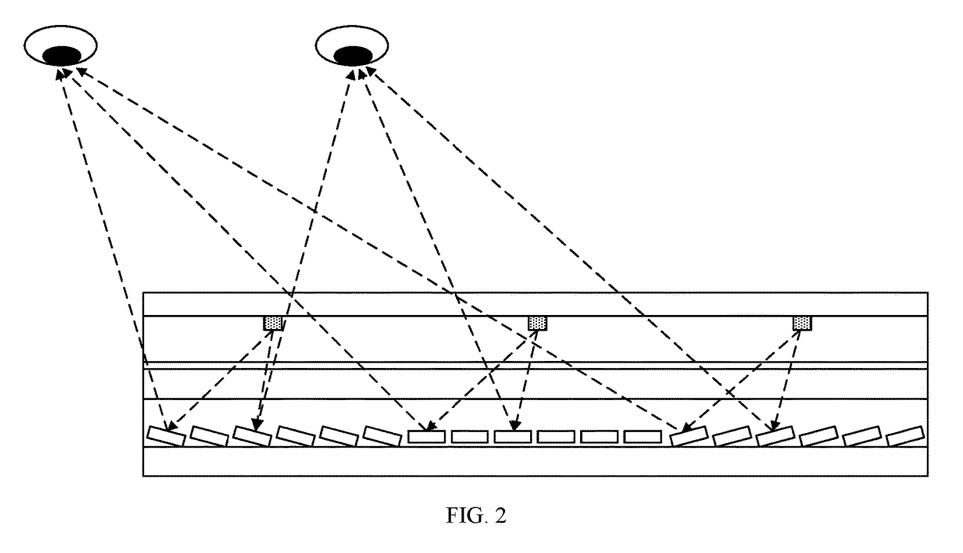
FIG. 2 is a light path diagram of the display panel shown in FIG. 1 during operation.

It should be noted that the first view zone may be one of a left-eye view zone and a right-eye view zone, and the second view zone may be the other of the left-eye view zone and the right-eye view zone. The left-eye view zone and the right-eye view zone are usually within a same human body. In an exemplary embodiment, referring to FIG. 2, a light path diagram of the display panel shown in FIG. 1 during operation is illustrated. The first reflective electrode 2011 corresponding to the light-emitting unit 101 may reflect the light emitted by the light-emitting unit 101 to the left-eye view zone. The second reflective electrode 2012 corresponding to the light-emitting unit 101 reflects the light emitted by the light-emitting unit 101 to the right-eye view zone.

In the present disclosure, the display panel 000 is a reflective display panel. A variety of types of reflective display panels are currently available. For example, the reflective display panel may be a liquid crystal display panel or a display panel based on electro-wetting. The embodiments hereinafter are described using an example in which the display panel 000 is a liquid crystal display panel.

In an exemplary embodiment, as shown in FIG. 1, the display panel 000 may further include: a liquid crystal layer 300 disposed between the first substrate 100 and the second substrate 200. The liquid crystal layer 300 is constituted by some regularly arranged liquid crystal molecules. The first substrate 100 in the display panel 000 may further include a common electrode 103. The second substrate 200 in the display panel 000 may further include: one or more thin film transistors (TFTs) electrically connected to each reflective electrode 201.

The display substrate 000 includes one or more pixel units 000a. Each pixel unit 000a may include: one light-emitting unit 101 and a common electrode 103 which are disposed in the first substrate 100, at least two reflective electrodes 201 corresponding to the light-emitting unit 101 and thin film transistors correspondingly connected to the reflective electrodes, which are disposed in the second substrate 200, and liquid crystal molecules disposed between the first substrate 100 and the second substrate.

In an exemplary embodiment, a voltage applied to the common electrode 103 is usually constant. When different voltages are applied to the reflective electrode 201 by the thin film transistor, different voltage differences are formed between the reflective electrode 201 and the common electrode 103. Under different voltage differences, the liquid crystal molecules distributed between the reflective electrode 201 and the common electrode 103 are deflected by different angles. In this way, emission rates of light, which is emitted by the light-emitting unit 101, then reflected by the reflective electrode 201 and emitted from the display panel 000, are different. That is, in response to different voltages being applied to the reflective electrode 201 by the thin film transistor, the light reflected by the reflective electrode 201 has different gray scales. In this case, in response to the two or more reflective electrodes 201 in the display panel 000 being loaded with corresponding voltages by respectively connected thin film transistors, the light reflected by respective reflective electrodes 201 has different gray scales, and therefore a complete picture is formed.

It should be explained that the above description takes a display panel working with a twisted nematic (TN) mode as an example for illustration. That is, an electric field, formed in response to the reflective electrode 201 which serves as pixel electrode and the common electrode 103 in the display panel being applied with voltages, is a vertical electric field. However, in the embodiment of the present disclosure, the display panel is not limited to the display panel in a vertical electric field mode, and may also be the display panel in a horizontal electric field mode, such as an advanced super dimension switch (ADS) mode, a fringe field switching (FFS) mode, or an in-plane switching (IPS) mode. For the display panel in the horizontal electric field mode, the reflective electrode 201 which serves as the pixel electrode and the common electrode 103 are both disposed on the second substrate.

In the present disclosure, the at least two reflective electrodes 201 corresponding to one light-emitting unit 101 in each pixel unit 000a may both include: a first reflective electrode 2011 and a second reflective electrode 2012. All the first reflective electrodes 2011 in the display panel 000 are capable of reflecting the light to the first view zone, such that a complete picture is viewed in the first view zone. All the second reflective electrodes 2012 in the display panel 000 are capable of reflecting the light to the second view zone, such that another complete picture is viewed in the second view zone. The picture viewed in the first view zone and the picture viewed in the second view zone may be two different pictures, such that a 3D effect of the picture displayed by the display panel 000 is achieved.

In an exemplary embodiment, in the display panel 000, at least one pixel unit 000a satisfies the following condition: in the pixel unit 000a, the voltage applied to the first reflective electrode 2011 is different from the voltage applied to the second reflective electrode 2012. In this way, the gray scale of the light reflected by the first reflective electrode 2011 is different from the gray scale of the light reflected by the second reflective electrode 2012, wherein the light is emitted by the light-emitting unit 201 in the pixel unit 000a. In this case, in the display panel 000, all the first reflective electrodes 2011 reflect the light to the first view zone, and all the second reflective electrodes 2012 reflect the light to the second view zone. Then the picture viewed in the first view zone is different from the picture viewed in the second view zone, such that a 3D effect of the picture displayed on the display panel 000 is achieved.

In summary, the display panel according to the embodiment of the present disclosure includes: the first substrate and the second substrate which are oppositely disposed. The first substrate may include: one or more light-emitting units, and the second substrate may include: two or more reflective electrodes. In the display panel, all the first reflective electrodes are capable of reflecting the light emitted by the light-emitting unit to the first view zone, and all the second reflective electrodes are capable of emitting the light emitted by the light-emitting unit to the second view zone. Therefore, a complete picture is viewed in the first view zone, and another complete picture is viewed in the second view zone. In addition, the two pictures may be two different pictures, such that a 3D effect of the picture displayed on the display panel is achieved, and therefore the display panel further achieves 3D display function, which enriches the display function of the display panel.

Figure 3:
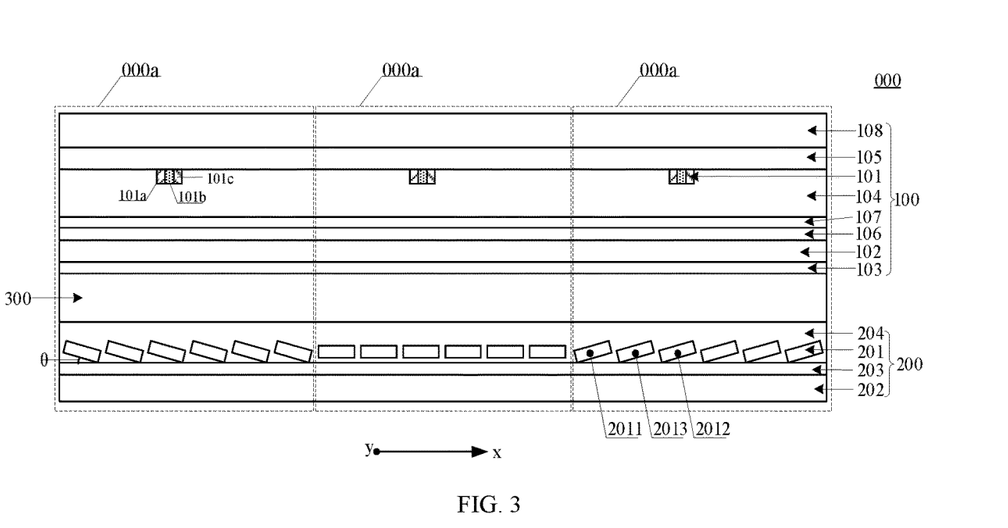
FIG. 3 is a schematic diagram of a film layer structure of another display panel according to an embodiment of the present disclosure.

Optionally, referring to FIG. 3, a schematic diagram of a film layer structure of another display panel according to an embodiment of the present disclosure is illustrated. The first substrate 100 in the display panel 000 may further include: a first base substrate 102. The one or more light-emitting units 101 in the first substrate 100 may be disposed on one side of the first base substrate 102, and the common electrode 103 in the first substrate 100 may be disposed on the other side of the first base substrate 102. The second substrate 200 in the display panel 000 may further include:

a second base substrate 202. The two or more reflective electrodes 201 and the thin film transistor electrically connected to each reflective electrode 201 in the second substrate 200 may be disposed on the second base substrate 202. In the display panel 000, the common electrode 103 in the first substrate 100 is, relative to the light-emitting unit 101, proximal to the second substrate 200. The one or more thin film transistors in the second substrate electrically connected to each reflective electrode 201 may form a thin film transistor structure layer 203 in FIG. 3.

Figure 4:
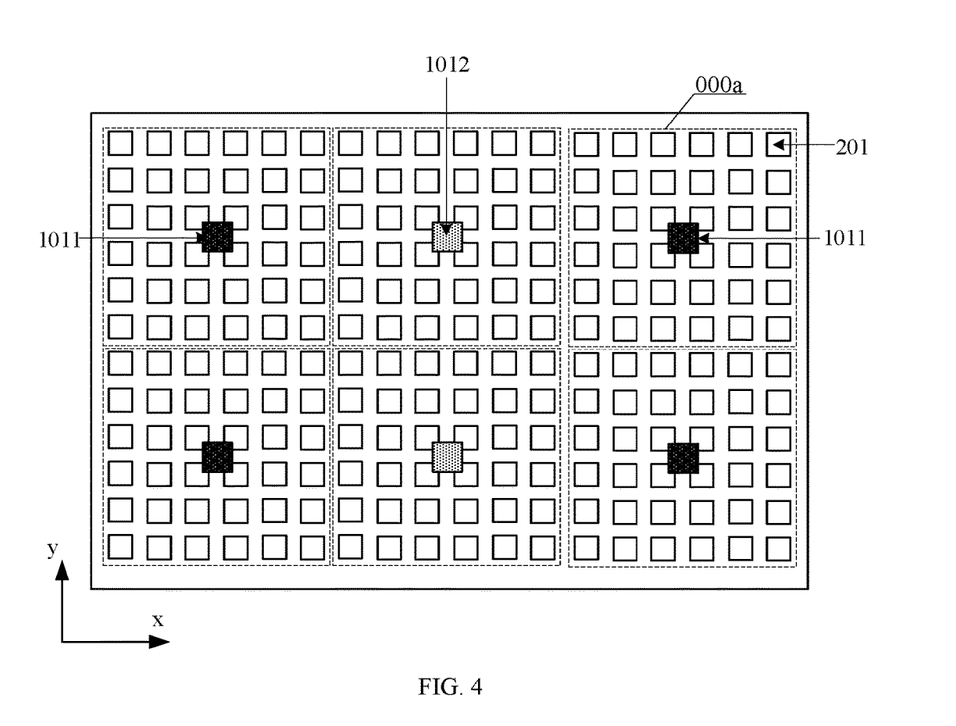
FIG. 4 is a top view of the display panel shown in FIG. 3.

Referring to FIG. 4, a top view of the display panel shown in FIG. 3 is illustrated. The one or more pixel units 000a in the display panel 000 are usually arranged in multiple rows and multiple columns, and a first direction x of column arrangement of the pixel unit 000a is perpendicular to a second direction y of row arrangement. In this way, the one or more light-emitting units 101 in the first substrate 100 in the display panel 000 may be arranged in multiple columns. The multiple columns of light-emitting units may be arranged in the first direction x of the pixel unit 000a. Each column of light-emitting units may include two or more light-emitting units 101, and the two or more light-emitting units 101 may be arranged in the second direction y (that is, a column direction) of the pixel unit 000a.

In an exemplary embodiment, the one or more light-emitting units 101 in the first substrate 100 may include: one column of second light-emitting units 1012 arranged in a column, and two or more columns of first light-emitting units 1011 arranged in columns. The one column of second light-emitting units 1012 may be disposed between the two or more columns of first light-emitting units 1011. A light-reflecting surface of the reflective electrode 201 corresponding to the second light-emitting units 1012 may be parallel to the second base substrate 202. A light-reflecting surface of the reflective electrode 201 corresponding to the first light-emitting unit 1011 may be tilted toward the one column of second light-emitting units 1012. That is, an included angle is defined between the light-reflecting surface of the reflective electrode 201 corresponding to the first light-emitting unit 1011 and the second base substrate 202. In this way, by controlling the included angle between the light-reflecting surface of the reflective electrode 201 corresponding to each first light-emitting unit 1011 and the second base substrate 202, it is ensured that the light, reflected by the first reflective electrode 2011 and the second reflective electrode 2012 corresponding to each light-emitting unit 101, is reflected into the first view zone and the second view zone.

It should be noted that the left eye and the right eye of a same user are distributed horizontally (usually, a distribution direction of the left eye and the right eye is parallel to the first direction x of the display panel 000). Therefore, the display panel 000 only needs to achieve the 3D display function in one direction (that is, the first direction x of the display panel 000). In this way, the reflective electrodes 201 corresponding to a same column of first light-emitting units 1011 are all tilted toward the one column of second light-emitting units 1012.

Figure 5:
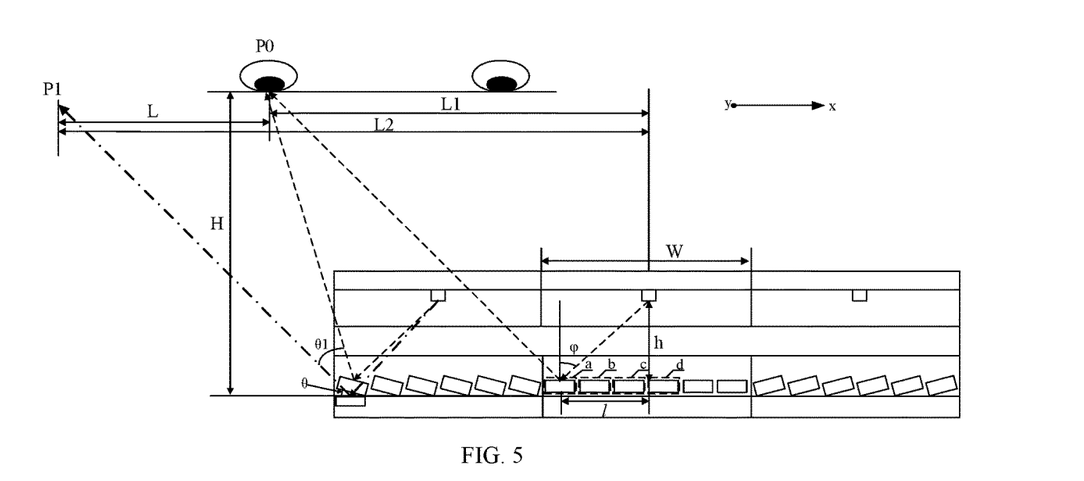
FIG. 5 is a light path diagram of the display panel shown in FIG. 3 during operation.

In an exemplary embodiment, referring to FIG. 5, a light path diagram of the display panel shown in FIG. 3 during operation is illustrated. It is assumed that an observation distance of the human eyes (that is, a distance between the human eyes and the reflective electrode 201 in a thickness direction of the display panel 000) is H (H usually represents a vertical distance between the first view zone and the second view zone and the display panel 000), a width of the irradiation region of each light-emitting unit 101 on the second substrate 200 (that is, the size in the first direction x) is W, and a distance, between the second light-emitting unit 1012 and the first reflective electrode 2011 corresponding to the second light-emitting unit 1012, in the first direction x is 1, and in the thickness direction of the display panel 000 is h.

Then a reflection angle φ of the first reflective electrode 2011 is:

$$\varphi = \arctan\left(\frac{l}{h}\right).$$

A distance L1 between a landing point P0 of the light reflected by the first reflective electrode 2011 on a human eye observation surface (that is, a plane where the left eye and right eye are located) and the second light-emitting unit 1012 in the first direction x is:

$$L1 = \frac{Hl}{h} + l \quad (1)$$

Similarly, for the first reflective electrode 2011 corresponding to the first light-emitting unit 1011 which is adjacent to the second light-emitting unit 1012 in the first direction x, in response to the light-reflecting surface of the first reflective electrode 2011 being parallel to the second base substrate 202, a distance L2 between a landing point P1 of the light reflected by the first reflective electrode 2011 on the human eye observation surface and the second light-emitting unit 1012 in the first direction x is:

$$L2 = \frac{Hl}{h} + l + W \quad (2)$$

In order to enable the landing point P1 of the light reflected by the first reflective electrode 2011 corresponding to the first light-emitting unit 1011 adjacent to the second light-emitting unit 1012 to coincide with the landing point P0, a translation distance L required for the landing point P1 of the light reflected by the first reflective electrode 2011 corresponding to the first light-emitting unit 1011 adjacent to the second light-emitting unit 1012 is:

$$L=L2-L1=W \quad (3)$$

A deflection angle θ1 required for the light reflected by the first reflective electrode 2011 is:

$$\theta 1 = \arctan\left(\frac{W}{H}\right) \quad (4)$$

According to a parallel plate reflection principle, the rotation angle of a reflecting surface is half of the rotation angle of reflected light. Therefore, the tilt angle θ required for the light-reflecting surface of the first reflective electrode 2011 is:

$$\theta = \frac{1}{2}\theta 1 = \frac{1}{2}\arctan\left(\frac{W}{H}\right) \approx \frac{W}{2H} \quad (5)$$

In this way, it is ensured that the light reflected by the first reflective electrode 2011 enters the left eye or the right eye of the same user.

Similarly, for the second reflective electrode 2012 corresponding to the first light-emitting unit 1011, the landing point of the light reflected by the second reflective electrode 2012 on the human eye observation surface also needs coincide with the landing point of the light reflected by the second reflective electrode 2012 corresponding to the second light-emitting unit 1012, such that the light reflected by the second reflective electrode 2012 enters the other one of the left eye and the right eye of the same user. In this case, a translation distance required for the landing point of the light reflected by the second reflective electrode 2012 corresponding to the first light-emitting unit 1011 is also W. Therefore, an equal tilt angle (that is θ) is required for the light-reflecting surface of the second reflective electrode 2012 and the light-reflecting surface of the first reflective electrode 2011 corresponding to the first light-emitting unit 1011. That is, for the first light-emitting unit 1011, an equal tilt angle (that is θ) is disposed for all corresponding reflective electrodes 201.

In the embodiment of the present disclosure, the size of an area, illuminated by each light-emitting unit 101 in the first substrate 100 on the second substrate 200, in the first direction x is W, and a distance between two adjacent light-emitting units 101 in the first direction x is also W. Therefore, the distances between the first light-emitting units 1011 disposed on any side of the one column of second light-emitting units 1012 and the second light-emitting units 1012 in the first direction x are in an arithmetic series. That is, the distance between the i$^{th}$ column of first light-emitting units 1011 and the second light-emitting units 1012 in the first direction x is i×W. That is, the translation distance required for the light reflected by the reflective electrode 201 corresponding to the i$^{th}$ column of first light-emitting units 1011 is i×W.

It can be seen from the above that in the i$^{th}$ column of first light-emitting units 1011 disposed on any side of one column of second light-emitting units 1012, the tilt angles θ of the light-reflecting surfaces of the reflective electrodes 201 corresponding to the first light-emitting units 1011 toward one column of second light-emitting units 1012 need to satisfy the following formula:

$$\theta = \frac{i \times W}{2H} \quad (6)$$

wherein W represents the width of the irradiation region of the first light-emitting unit 1011 on the second substrate 200 (i.e., the size in the first direction x), and H represents the vertical distance between the first view zone and the second view zone and the display panel 000.

It can be seen from the above description that in the embodiment of the present disclosure, in a same column of first light-emitting units 1011, tilt angels of the light-reflecting surfaces of the reflective electrodes 201 corresponding to each of the first light-emitting units 1011 toward the one column of second light-emitting units 1012 are equal.

In two or more columns of first light-emitting units 1011, two columns of first target light-emitting units satisfy the following conditions: the two columns of first target light-emitting units are respectively disposed on two sides of the one column of second light-emitting units 1012, and the distances between the two columns of first target light-emitting units and the one column of second light-emitting units 1012 are the same. In the two columns of first target light-emitting units, tile angels of the light-reflecting surfaces of the reflective electrodes 201 corresponding to each of the first target light-emitting units toward the one column of second light-emitting units 1012 are equal. That is, in the two columns of first target light-emitting units, a tilt direction, relative to the second base substrate 202, of the reflective electrode 201 corresponding to one column of target light-emitting units is different from a tilt direction, relative to the second base substrate 202, of the reflective electrode 201 corresponding to the other column of target light-emitting units. However, the tilt angles of the reflective electrodes 201 corresponding to the two columns of first target light-emitting units relative to the second base substrate 202 are equal. That is, acute angles between the light-reflecting surfaces of the reflective electrodes 201 corresponding to the two columns of first target light-emitting units and the second base substrate 202 are equal.

It should be noted that, according to the above formula (6), for each light-emitting unit of the first light-emitting units 1011, the tilt angle θ of the light-reflecting surface of the corresponding reflective electrode 201 toward one column of second light-emitting units 1012 is only related to the parameter H and parameter W. The parameter W represents the size of the area illuminated by the light-emitting unit on the second substrate 200 in the first direction x. A value of the parameter W is fixed in response to determining the type of the light-emitting unit. The parameter H represents the vertical distance between the first view zone and the second view zone and the display panel 000. A value of the parameter H is determined by analyzing vertical distances between the user eyes and the display device when the user uses the display device. The value of the parameter H is also fixed. Therefore, the tilt angle of the reflecting surface of the reflective electrode 201 in the display panel 000 is determined by the above formula (6).

Optionally, as shown in FIG. 3, for the reflective electrode 201 corresponding to each light-emitting unit 101, a distance between the first reflective electrode 2011 and the second reflective electrode 2012 is greater than a predetermined distance threshold. In this way, it is ensured that a certain distance is formed between the light reflected by the first reflective electrode 2011 and the light reflected by the second reflective electrode 2012, thereby ensuring that for the same user, the left eye is capable of only viewing the light reflected by the first reflective electrode 2011, and the right eye is capable of only viewing the light reflected by the second reflective electrode 2012, which prevents a crosstalk in images viewed by the left eye and right eye of the same user, and improves the 3D display effect of the display panel 000.

In an exemplary embodiment, the at least two reflective electrodes 201 corresponding to each of the light-emitting units 101 may further include: one or more third reflective electrodes 2013 disposed between the first reflective electrode 2011 and the second reflective electrode 2012. The third reflective electrode 2013 is capable of always reflecting the light to the human eyes during a translation process of the user eyes, which improves the display effect of the display panel 000.

In an exemplary embodiment, taking FIG. 5 as an example, when the user eyes are at the positions shown in FIG. 5, for each light-emitting unit 101, the corresponding reflective electrode at position a is the first reflective electrode 2011, the corresponding reflective electrode at position b is the third reflective electrode 2013, and the corresponding reflective electrode at position c is the second reflective electrode 2012. The light reflected by the first reflective electrode 2011 enters one of the left and right eyes of the same user, and the light reflected by the second reflective electrode 2012 enters the other of the left and right eyes of the same user. When the positions of the user eyes are translated, for example, when the user eyes are translated along the first direction x, for each light-emitting unit, the corresponding reflective electrode at the position b is the first reflective electrode 2011, the corresponding reflective electrode at the position c is the third reflective electrode 2013, and the corresponding reflective electrode at position d is the second reflective electrode 2012. The light reflected by the first reflective electrode 2011 enters one of the left and right eyes of the same user, and the light reflected by the second reflective electrode 2012 enters the other of the left and right eyes of the same user. In this way, in response to the observation distance of the human eyes being a predetermined distance, during translation of the positions of the human eyes, the display panel 000 always achieves a 3D display effect.

It should be noted that in two or more reflective electrodes 201 corresponding to any two light-emitting units 101, an equal number of the third reflective electrodes 2013 are disposed between the first reflective electrode 2011 and the second reflective electrode 2012.

In an exemplary embodiment, no matter where the user eyes are translated, an equal number of the third reflective electrodes 2012 are disposed between the first reflective electrode 2011 and the second reflective electrode 2012 in the second substrate 200. That is, relative position of the first reflective electrode 2011 and the second reflective electrode 2012 remains unchanged.

It should also be noted that, the more the number of the third reflective electrodes 2013 arranged between the first reflective electrode 2011 and the second reflective electrode 2012 is, the farther the distance between the light reflected by the first reflective electrode 2011 and the light reflected by the second reflective electrode 2012 is, and the better the 3D display effect of the display panel 000 is.

Figure 6:
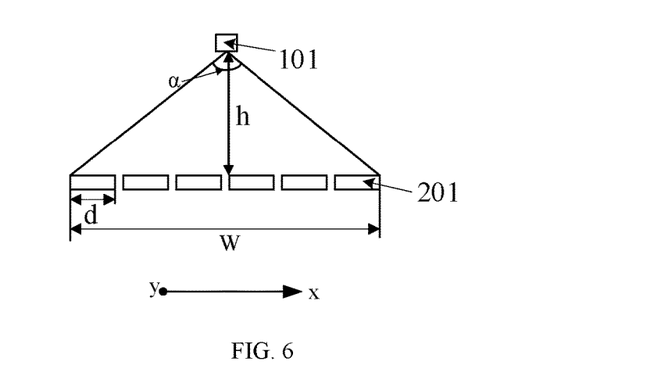
FIG. 6 is a schematic diagram that a light-emitting unit in the display panel shown in FIG. 3 illuminates a second substrate.
Figure 7:
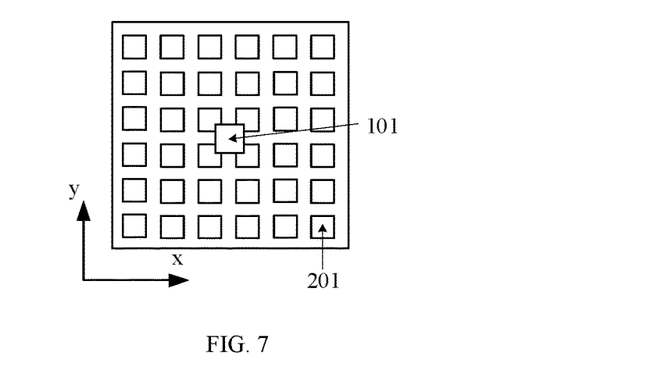
FIG. 7 is a schematic diagram of arrangement of reflective electrodes corresponding to each light-emitting unit in the display panel shown in FIG. 3.

In the embodiment of the present disclosure, as shown in FIG. 6 and FIG. 7, FIG. 6 is a schematic diagram that the light-emitting unit in the display panel shown in FIG. 3 illuminates the second substrate, and FIG. 7 is a schematic diagram of arrangement of the reflective electrodes corresponding to each light-emitting unit in the display panel shown in FIG. 3. The reflective electrodes 201 corresponding to each light-emitting unit 101 are arranged in an array, and the arrangement of the reflective electrodes 201 may be the same as the arrangement of the pixel units 000*a* in the display panel 000. That is, the at least two reflective electrodes 201 corresponding to each light-emitting unit 101 may be arranged in multiple columns in the first direction x, and arranged in multiple rows in the second direction y. In addition, the reflective electrodes 201 corresponding to any two light-emitting units 101 are arranged in arrays containing an equal number of rows and an equal number of columns. It should be noted that the array of the at least two reflective electrodes 201 corresponding to each light-emitting unit 101 contains an equal number of rows and columns.

In the present disclosure, the size W of the irradiation region of each light-emitting unit 101 on the second substrate 200 in the first direction x is:

$$W = 2h \tan\left(\frac{\alpha}{2}\right) \quad (7)$$

wherein a represents a light emergent angle of the light-emitting unit 101.

The number S of the reflective electrodes 201 corresponding to each light-emitting unit 101 in the first direction x is:

$$S = \frac{W}{d} \quad (8)$$

wherein d represents the size of the reflective electrode 201 in the first direction x, for example, the size of an orthogonal projection of the reflective electrode 201 on the first substrate 100 in the first direction x. In an example of the present disclosure, an equal size in the first direction x is set for each reflective electrode 201 corresponding to the light-emitting unit 101. Further, the reflective electrodes 201 corresponding to different light-emitting units 101 may have a same size in the first direction x.

The size of the area illuminated by each of the light-emitting units 101 on the second substrate 200 in the first direction x is W, and therefore an equal number S of the reflective electrodes 201 corresponds to each of the light-emitting units 101.

In the present disclosure, the reflective electrode 201 in the second substrate 200 may include: a conductive electrode with light-reflecting properties. The reflective electrode 201 in the second substrate 200 may also include: a conductive electrode, and a light-reflecting material coated on the surface of the conductive electrode.

Optionally, the thin film transistor structure layer 203, which is in the first substrate 100 of the display panel 000, includes an insulating layer, wherein the insulating layer is disposed on one side of the thin-film transistor structure layer 203 proximal to the reflective electrode 201. Exemplarily, referring to FIG. 8, a schematic diagram of the insulating layer and the reflective electrode on the insulating layer according to an embodiment of the present disclosure is illustrated. The insulating layer 203*a* may have a slope gradient. Thus, in response to the reflective electrode 201 being formed on the insulating layer 203*a*, an included angle is defined between the reflective electrode 201 and the second base substrate 202.

In the embodiment of the present disclosure, as shown in FIG. 3, the light-emitting unit 101 in each pixel unit 000*a* in the display panel 000 is configured to emit light of one color, such that each pixel unit 000*a* is a pixel unit capable of emitting light of a corresponding color. In the present disclosure, three adjacently arranged pixel units 000*a* for emitting different colors may form one pixel. For example, the light-emitting unit in the pixel unit a1 is configured to emit red light, the light-emitting unit in the pixel unit a2 is configured to emit green light, and the light-emitting unit in the pixel unit a3 is configured to emit blue light. In this case, a color filter layer is not necessary for the display panel 000, which effectively simplifies a film layer structure of the display panel 000.

In an exemplary embodiment, the light-emitting unit 101 may be a light-emitting diode (LED), a mini light-emitting diode (Mini-LED), or a micro light-emitting diode (Micro-LED).

In the present disclosure, as shown in FIG. 3, the light-emitting unit 101 may include: a red light-emitting unit 101*a*, a green light-emitting unit 101*b*, and a blue light-emitting unit 101*c* which are laminated in a direction parallel to a light-emitting surface of the display panel 000. The light-emitting surface of the display panel 000 is parallel to a surface of the first base substrate 102 toward the second base substrate 202, and the direction parallel to the light-emitting surface of the display panel 000 may be the first direction x or the second direction y shown in FIG. 3 and FIG. 4, as long as the direction is parallel to the light-emitting surface of the display panel 000, which is not limited in the present disclosure. Gaps between the red light-emitting unit 101a, the green light-emitting unit 101b, and the blue light-emitting unit 101c are within 50 microns. The first substrate 100 in the display panel 000 may further include: a light-emitting unit driving circuit layer 105 disposed on one side of the light-emitting unit 101 distal from the first base substrate. The light-emitting unit driving circuit layer 105 may include one or more light-emitting unit driving circuits electrically connected to the one or more light-emitting units in one-to-one correspondence, wherein each light-emitting unit driving circuit is capable of controlling the color and brightness of the light emitted by the light-emitting unit 101 electrically connected thereto. In this way, the light-emitting unit driving circuit layer 105 is capable of controlling the light-emitting unit 101 to only emit the light of one color.

Optionally, as shown in FIG. 3, the first substrate 100 in the display panel 000 may further include: an optical protective layer 104 disposed between the first base substrate 102 and the light-emitting unit 101. The optical protective layer 104 may cover the light-emitting unit 101 to protect the light-emitting unit 101.

The first substrate 100 may further include: a film layer 106 with a thickness of a quarter wavelength of the light and a polarizer 107 which are disposed between the first base substrate 102 and the optical protective layer 104. The polarizer 107 is proximal to the light-emitting unit 101 relative to the film layer 106. The film layer 106 and the polarizer 107 are capable of modulating the light before the light enters the liquid crystal layer 300 in the display panel 000. In this way, in response to different voltages being loaded on the reflective electrode 201, transmittances of the light passing through the film layer 106 and the polarizer 107 are different, wherein the light is firstly modulated by the film layer 106 and the polarizer 107, and subsequently reflected by the reflective electrode 201.

The first substrate 100 may further include: a protective cover plate 108 disposed on one side, distal from the light-emitting unit 101, of the light-emitting unit driving circuit layer 105. The protective cover plate 108 generally may be a glass cover plate, and the film layer structure in the display panel 000 may be protected by the protective cover plate 108.

Optionally, as shown in FIG. 3, the second substrate 200 in the display panel 000 may further include: a protective layer 204 disposed on one side of the reflective electrode 201 distal from the second base substrate 202. The protective layer 204 not only can protect the reflective electrode 201, but also ensures flatness of alignment layers (not shown in the figures) disposed on both sides of the liquid crystal layer 300, thereby ensuring that the alignment layers ensure that liquid crystal molecules are accurately distributed in the liquid crystal layer 300.

Optionally, in a case where ambient light is strong, for example, in an outdoor environment, the light-emitting unit 101 in the first substrate 100 may be controlled not to emit light, and the reflective electrode 201 in the second substrate 200 directly reflects the ambient light. In this case, the display panel 000 realizes a 2D display function. In a case where the ambient light is weak, for example, in an indoor environment, the light-emitting unit 101 in the first substrate 100 may be controlled to emit light, and the reflective electrode 201 in the second substrate 200 reflects the light emitted by the light-emitting unit 101. In this case, the display panel 000 realizes a 3D display function.

In summary, the display panel according to the embodiments of the present disclosure includes: the first substrate and the second substrate which are oppositely disposed. The first substrate may include: one or more light-emitting units, and the second substrate may include: two or more reflective electrodes. In the display panel, all the first reflective electrodes are capable of reflecting the light emitted by the light-emitting unit to the first view zone, and all the second reflective electrodes are capable of emitting the light emitted by the light-emitting unit to the second view zone. Therefore, a complete picture is viewed in the first view zone, and another complete picture is viewed in the second view zone. In addition, the two pictures may be two different pictures, such that a 3D effect of the picture displayed on the display panel is achieved, and a 3D display function of the display panel is further achieved, which enriches the display function of the display panel.

Figure 9:
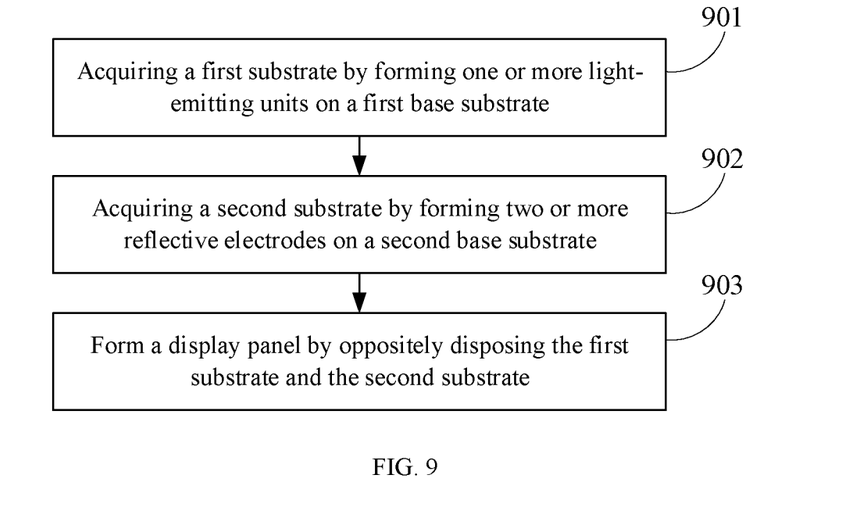
FIG. 9 is a flowchart of a method for manufacturing a display panel according to an embodiment of the present disclosure.

An embodiment of the present disclosure provides a method for manufacturing a display panel. Referring to FIG. 9, a flowchart of a method for manufacturing a display panel according to an embodiment of the present disclosure is illustrated. The method is employed to manufacture the display panel shown in FIG. 1. The method may include the following processes.

In process 901, a first substrate is acquired by forming one or more light-emitting units on a first base substrate.

In process 902, a second substrate is acquired by forming two or more reflective electrodes on a second base substrate.

In process 903, a display panel is formed by oppositely disposing the first substrate and the second substrate.

One light-emitting unit corresponds to at least two reflective electrodes, and the at least two reflective electrodes corresponding to one light-emitting unit are disposed in an irradiation region of the light-emitting unit on the second substrate. The at least two reflective electrodes corresponding to one light-emitting unit include a first reflective electrode and a second reflective electrode. The first reflective electrode is configured to reflect light emitted by the light-emitting unit to a first view zone, and the second reflective electrode is configured to reflect the light emitted by the light-emitting unit to a second view zone.

In summary, in the method for manufacturing the display panel according to the embodiment of the present disclosure, in the display panel, all the first reflective electrodes are capable of reflecting the light emitted by the light-emitting unit to the first view zone, and all the second reflective electrodes are capable of reflecting the light emitted by the light-emitting unit to the second view zone. Therefore, a complete picture is viewed in the first view zone, and another complete picture is viewed in the second view zone. In addition, the two pictures may be two different pictures, such that a 3D effect of the picture displayed on the display panel is achieved, and a 3D display function of the display panel is further achieved, which enriches the display function of the display panel.

Figure 10:
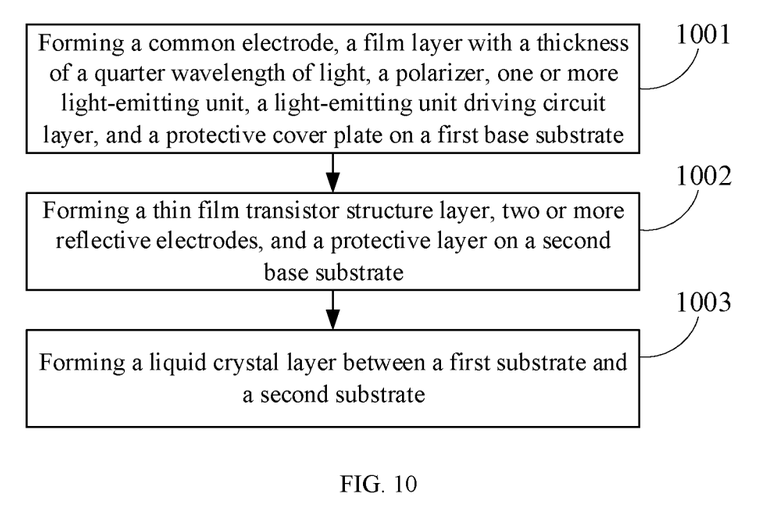
FIG. 10 is a flowchart of another method for manufacturing a display panel according to an embodiment of the present disclosure.

Referring to FIG. 10, a flowchart of another method for manufacturing a display panel according to an embodiment of the present disclosure is illustrated. The method is employed to manufacture the display panel shown in FIG. 3. The method includes the following processes.

In process 1001, a common electrode, a film layer with a thickness of a quarter wavelength of light, a polarizer, one or more light-emitting units, a light-emitting unit driving circuit layer, and a protective cover plate are formed on a first base substrate.

In an exemplary embodiment, process 1001 may include the following manufacturing process.

Firstly, the common electrode is formed on one side of the first base substrate.

Afterwards, the first base substrate is turned over, and the film layer with the thickness of a quarter wavelength of the light and the polarizer are formed on the other side of the first base substrate.

Then one or more light-emitting units and the light-emitting unit driving circuit layer are formed on the first base substrate on which the polarizer is formed. The light-emitting unit driving circuit layer includes one or more light-emitting unit driving circuits electrically connected to the one or more light-emitting units in one-to-one correspondence. The light-emitting unit driving circuit layer is configured to control the color and brightness of the light emitted by the one or more light-emitting units.

Finally, the protective cover plate is formed on the first base substrate on which the light-emitting unit driving circuit layer is formed. A material of the protective cover plate may be a hard transparent material such as glass.

It should be noted that a first substrate is acquired by the above manufacturing process.

In process 1002, a thin film transistor structure layer, two or more reflective electrodes, and a protective layer are formed on a second base substrate.

In an exemplary embodiment, process 1002 may include the following manufacturing process.

Firstly, the thin film transistor structure layer is formed on one side of the second base substrate. The thin film transistor structure layer includes thin film transistors electrically connected to multiple reflective electrodes in one-to-one correspondence. The thin film transistor structure layer includes an insulating layer disposed on one side of the thin film transistor structure layer distal from the second base substrate. A material of the insulating layer may be an organic or inorganic material.

Then one or more patterning processes are performed on the insulating layer in the thin film transistor structure layer to form a slope on the insulating layer. For example, two or more groups of slopes with different slope gradients may be formed on the insulating layer. A slope gradient of the slope is related to an included angle between the reflective electrode subsequently formed on the slope and the second base substrate.

Figure 11:
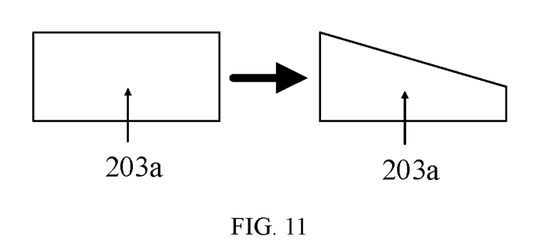
FIG. 11 is a schematic diagram of a plurality of groups of slopes with different slope gradients formed on an insulating layer according to an embodiment of the present disclosure.

In an exemplary embodiment, referring to FIG. 11, a schematic diagram of forming a plurality of groups of slopes with different slope gradients on the insulating layer according to an embodiment of the present disclosure is illustrated. In an embodiment, in a case where the plurality of groups of slopes with different slope gradients is formed on the insulating layer 203a by performing one patterning process on the insulating layer 203a, a gray-scale mask may be adopted to perform one patterning process on the insulating layer 203a to form the plurality of groups of slopes with different slope gradients.

In another embodiment, during forming the plurality of groups of slopes with different slope gradients on the insulating layer 203a by performing multiple patterning processes on the insulating layer 203a, in each of the patterning processes, the thickness of different regions of the insulating layer 203a are reduced to different degrees. In this way, by the multiple patterning processes, the plurality of groups of slopes with different slope gradients may be formed on the insulating layer 203a. Each of the patterning processes described above may include: photoresist coating, exposure, development, etching, and photoresist stripping.

Figure 8:
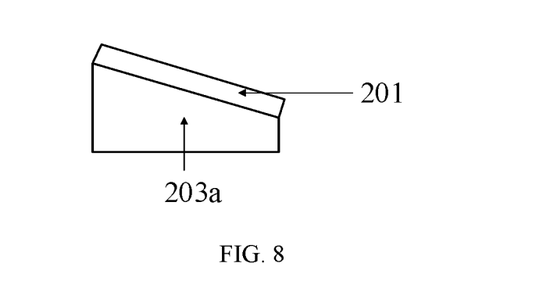
FIG. 8 is a schematic diagram of an insulating layer and a reflective electrode on the insulating layer according to an embodiment of the present disclosure.

Thereafter, as shown in FIG. 8, two or more reflective electrodes 201 may be formed on the insulating layer 203a with the slopes. For example, the reflective electrodes 201 may be formed on the insulating layer with two groups of slopes of different slope gradients, such that included angles are defined between the reflective electrodes 201 on the slopes and the second base substrate.

Finally, the protective layer is formed on the reflective electrode.

It should be noted that the second substrate may be acquired by the above manufacturing process.

In process 1003, a liquid crystal layer is formed between the first substrate and the second substrate.

In an exemplary embodiment, the first substrate and the second substrate are oppositely disposed, such that the common electrode in the first substrate faces the second substrate, and the reflective electrode in the second substrate faces the first substrate. Afterwards, the liquid crystal layer may be formed between the first substrate and the second substrate.

It should be noted that the display panel as shown in FIG. 3 is acquired by processes 1001 to 1003.

Those skilled in the art can clearly understand that, for convenience and conciseness of description, working principles and connection relationships of different structures in the display panel described above may be referenced to the corresponding content in the foregoing structure embodiments of the display panel, which are not repeated herein.

In summary, in the method for manufacturing the display panel according to the embodiment of the present disclosure, in the display panel, all the first reflective electrodes are capable of reflecting the light emitted by the light-emitting unit to the first view zone, and all the second reflective electrodes are capable of emitting the light emitted by the light-emitting unit to the second view zone. Therefore, a complete picture is viewed in the first view zone, and another complete picture is viewed in the second view zone. In addition, the two pictures may be two different pictures, such that a 3D effect of the picture displayed on the display panel is achieved, and a 3D display function of the display panel is further achieved, which enriches the display function of the display panel.

An embodiment of the present disclosure provides a display device, which may include the display panel shown in FIG. 1 or FIG. 3. The display device may be a display device capable of achieving the 3D display function. For example, the display device may be any product or component with a display function, such as electronic paper, a mobile phone, a tablet computer, a television, a display, a notebook computer, a digital photo frame, or a navigator.

It should be noted that for clarity of the illustration, the dimensions of the layers and regions in the accompanying drawings may be exaggerated. It can be understood that when an element or layer is described as being "on" another element or layer, the described element or layer may be directly on the other element or layer, or at least one intermediate layer may be disposed between the described element or layer and the other element or layer. In addition, it can be understood that when an element or layer is described as being "under" another element or layer, the described element or layer may be directly under the other element or layer, or at least one intermediate layer may be disposed between the described element or layer and the other element or layer. In addition, it can be further understood that when a layer or element is described as being arranged "between" two layers or elements, the described layer or element may be the only layer between the two layers or elements, or at least one intermediate layer or element may be disposed between the described element or layer and the two layers or elements. In the whole description above, like reference numerals indicate like elements.

In the present disclosure, the terms "first" and "second" are used only for the purposes of description and are not to be construed as indicating or implying relative importance. The term "plurality" refers to two or more, unless clearly defined otherwise.

Described above are merely exemplary embodiments of the present disclosure, and are not intended to limit the present disclosure. Within the spirit and principles of the disclosure, any modifications, equivalent substitutions, improvements, and the like are within the protective scope of the present disclosure.

What is claimed is:

1. A display panel, comprising a first substrate and a second substrate which are oppositely disposed; wherein
   the first substrate comprises one or more light-emitting units;
   the second substrate comprises two or more reflective electrodes, wherein one of the one or more light-emitting units corresponds to at least two of the two or more reflective electrodes, and the at least two of the two or more reflective electrodes are disposed in an irradiation region of the light-emitting unit on the second substrate; wherein the at least two of the two or more reflective electrodes comprise a first reflective electrode and a second reflective electrode, the first reflective electrode being configured to reflect light emitted by the light-emitting unit to a first view zone, and the second reflective electrode being configured to reflect the light emitted by the light-emitting unit to a second view zone; and
   the second substrate further comprises a second base substrate, wherein
   the at least two of the two or more reflective electrodes are disposed on the second base substrate; and
   the one or more light-emitting units comprise one column of second light-emitting units arranged in a column and two or more columns of first light-emitting units arranged in columns, wherein the one column of second light-emitting units is disposed between the two or more columns of first light-emitting units; a light-reflecting surface of the reflective electrode corresponding to the second light-emitting units is parallel to the second base substrate; and a light-reflecting surface of the reflective electrode corresponding to the first light-emitting units is tilted toward the one column of second light-emitting units.

2. The display panel according to claim 1, wherein in the at least two of the two or more reflective electrodes, a voltage applied to the first reflective electrode is different from a voltage applied to the second reflective electrode.

3. The display panel according to claim 1, wherein in a same column of first light-emitting units, tilt angles of the light-reflecting surfaces of the reflective electrodes corresponding to each of the first light-emitting units toward the one column of second light-emitting units are equal.

4. The display panel according to claim 1, wherein two columns of first target light-emitting units in the two or more columns of first light-emitting units satisfy the following conditions: the two columns of first target light-emitting units are respectively disposed on two sides of the one column of second light-emitting units, distances between the two columns of first target light-emitting units and the one column of second light-emitting units are the same, and in the two columns of first target light-emitting units, tilt angles of the light-reflecting surfaces of the reflective electrodes corresponding to each of the first target light-emitting units toward the one column of second light-emitting units are equal.

5. The display panel according to claim 1, wherein in an $it^{th}$ column of first light-emitting units disposed on any side of the one column of second light-emitting units, tilt angles $\theta$ of the light-reflecting surfaces of the reflective electrodes corresponding to the first light-emitting units toward the one column of second light-emitting units satisfy the following formula:

$$\theta = \frac{i \times W}{2H},$$

wherein W represents a width of the irradiation region of the first light-emitting unit on the second substrate, and H represents a vertical distance between the first view zone and the second view zone, and the display panel.

6. The display panel according to claim 1, wherein the at least two of the two or more reflective electrodes further comprise one or more third reflective electrodes disposed between the first reflective electrode and the second reflective electrode.

7. The display panel according to claim 6, wherein in two or more reflective electrodes corresponding to any two of the one or more light-emitting units, an equal number of the third reflective electrodes are disposed between the first reflective electrode and the second reflective electrode.

8. The display panel according to claim 1, wherein an equal number of the reflective electrodes correspond to each of the one or more light-emitting units.

9. The display panel according to claim 8, wherein the reflective electrodes corresponding to each of the one or more light-emitting units are arranged in an array, and the reflective electrodes corresponding to any two of the one or more light-emitting units are arranged in arrays containing an equal number of rows and an equal number of columns.

10. The display panel according to claim 9, wherein the array of the reflective electrodes corresponding to each of the one or more light-emitting units contains an equal number of rows and columns.

11. The display panel according to claim 1, wherein the display panel further comprises: a liquid crystal layer disposed between the first substrate and the second substrate.

12. The display panel according to claim 1, wherein the display panel comprises one or more pixel units, wherein the pixel unit comprises one of the one or more light-emitting units, and at least two reflective electrodes corresponding to the one of the one or more light-emitting units, the one of the one or more light-emitting units in the pixel unit being configured to emit light of one color.

13. The display panel according to claim 12, wherein the light-emitting unit comprises a red light-emitting unit, a green light-emitting unit, and a blue light-emitting unit which are laminated in a direction parallel to a light-emitting surface of the display panel.

14. The display panel according to claim 13, wherein the first substrate further comprises one or more light-emitting unit driving circuits electrically connected to the one or more light-emitting units in one-to-one correspondence, wherein the light-emitting unit driving circuit is configured to control a color and a brightness of the light emitted by a corresponding light-emitting unit.

15. The display panel according to claim 1, wherein:
the first substrate further comprises a first base substrate, the one or more light-emitting units are disposed on one side of the first base substrate, and the first substrate further comprises a common electrode disposed on the other side of the first base substrate, the common electrode being, relative to the light-emitting unit, proximal to the second substrate;
the second substrate further comprises a second base substrate, the two or more reflective electrodes are disposed on the second base substrate, and the second substrate further comprises one or more thin film transistors disposed on the second base substrate and electrically connected to each of the reflective electrodes.

16. A method for manufacturing a display panel, comprising:
acquiring a first substrate by forming one or more light-emitting units on a first base substrate;
acquiring a second substrate by forming two or more reflective electrodes on a second base substrate; and
forming the display panel by oppositely disposing the first substrate and the second substrate;
wherein one of the one or more light-emitting units corresponds to at least two of the two or more reflective electrodes, and the at least two of the two or more reflective electrodes corresponding to the one of the one or more light-emitting units are disposed in an irradiation region of the light-emitting unit on the second substrate; and the at least two of the two or more reflective electrodes corresponding to the one of the one or more light-emitting units comprise a first reflective electrode and a second reflective electrode, the first reflective electrode being configured to reflect light emitted by the light-emitting unit to a first view zone, and the second reflective electrode being configured to reflect the light emitted by the light-emitting unit to a second view zone; and
the one or more light-emitting units comprise one column of second light-emitting units arranged in a column and two or more columns of first light-emitting units arranged in columns, wherein the one column of second light-emitting units is disposed between the two or more columns of first light-emitting units; a light-reflecting surface of the reflective electrode corresponding to the second light-emitting units is parallel to the second base substrate; and a light-reflecting surface of the reflective electrode corresponding to the first light-emitting units is tilted toward the one column of second light-emitting units.

17. The method according to claim 16, wherein forming the two or more reflective electrodes on the second base substrate comprises:
forming an insulating layer on the second base substrate, and forming a slope on the insulating layer by performing at least one patterning process on the insulating layer; and
forming the two or more reflective electrodes on the insulating layer with the slope, such that an included angle is defined between a reflecting surface of the reflective electrode on the slope and the second base substrate.

18. A display device comprising a display panel comprising a first substrate and a second substrate which are oppositely disposed; wherein
the first substrate comprises one or more light-emitting units;
the second substrate comprises two or more reflective electrodes, wherein one of the one or more light-emitting units corresponds to at least two of the two or more reflective electrodes, and the at least two of the two or more reflective electrodes are disposed in an irradiation region of the light-emitting unit on the second substrate; wherein the at least two of the two or more reflective electrodes comprise a first reflective electrode and a second reflective electrode, the first reflective electrode being configured to reflect light emitted by the light-emitting unit to a first view zone, and the second reflective electrode being configured to reflect the light emitted by the light-emitting unit to a second view zone; and
the second substrate further comprises a second base substrate, wherein
the at least two of the two or more reflective electrodes are disposed on the second base substrate; and
the one or more light-emitting units comprise one column of second light-emitting units arranged in a column and two or more columns of first light-emitting units arranged in columns, wherein the one column of second light-emitting units is disposed between the two or more columns of first light-emitting units; a light-reflecting surface of the reflective electrode corresponding to the second light-emitting units is parallel to the second base substrate; and a light-reflecting surface of the reflective electrode corresponding to the first light-emitting units is tilted toward the one column of second light-emitting units.

19. The display device according to claim 18, wherein in the at least two of the two or more reflective electrodes, a voltage applied to the first reflective electrode is different from a voltage applied to the second reflective electrode.

* * * * *